United States Patent
Drooghaag et al.

(10) Patent No.: US 9,300,358 B2
(45) Date of Patent: Mar. 29, 2016

(54) METHOD AND DEVICE FOR IDENTIFYING CROSSTALK

(71) Applicant: Alcatel Lucent, Boulogne-Billancourt (FR)

(72) Inventors: Benoît Drooghaag, Namur (BE); Issam Wahibi, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/419,473

(22) PCT Filed: Jul. 23, 2013

(86) PCT No.: PCT/EP2013/065454
§ 371 (c)(1),
(2) Date: Feb. 3, 2015

(87) PCT Pub. No.: WO2014/040782
PCT Pub. Date: Mar. 20, 2014

(65) Prior Publication Data
US 2015/0229355 A1    Aug. 13, 2015

(30) Foreign Application Priority Data
Sep. 17, 2012  (EP) ..................................... 12306114

(51) Int. Cl.
*H04M 1/24*   (2006.01)
*H04M 3/08*   (2006.01)
(Continued)

(52) U.S. Cl.
CPC .................. *H04B 3/32* (2013.01); *H04B 3/487* (2015.01); *H04M 3/34* (2013.01); *H04M 11/062* (2013.01)

(58) Field of Classification Search
CPC .... H04M 3/085; H04M 3/304; H04M 11/062; H04M 2203/056; H04M 3/306; H04M 3/34; H04B 3/32; H04B 3/487; H04B 3/486; H04L 12/26; H04L 12/2856; H04L 12/2874; H04L 12/2892
USPC ............... 379/1.01, 1.03, 1.04, 22, 22.08, 24; 370/201, 252
See application file for complete search history.

(56) References Cited

U.S. PATENT DOCUMENTS 8,767,521 B2 *  7/2014  Singh .................... H04M 3/304
                                                      370/201
8,908,749 B2 * 12/2014  Fang ........................ H04B 3/32
                                                      375/220
(Continued)

FOREIGN PATENT DOCUMENTS

EP           1672809 A1     6/2006

OTHER PUBLICATIONS

International Search Report PCT/ISA/210 for International Application No. PCT/EP2013/065454 Dated Nov. 5, 2013.
(Continued)

*Primary Examiner* — Binh Tieu
(74) *Attorney, Agent, or Firm* — Harness, Dickey & Pierce, P.L.C.

(57) ABSTRACT

In a method and a device for identifying crosstalk from a disturbing telecommunication line to a victim telecommunication line of a communication network, the identifying depends on quiet line noise measurement data related to the victim telecommunication line. In order to provide such a method and associated device that allows for detecting abnormally high crosstalk caused by high bit rate telecommunication lines running in parallel to a section of the victim telecommunication line, the method includes estimating a coupling length depending on the quiet line noise measurement data; and detecting depending on the coupling length and a physical length of the victim telecommunication line that the crosstalk is caused by the disturbing telecommunication line extending in parallel to a section of the victim telecommunication line.

15 Claims, 4 Drawing Sheets

(51) Int. Cl.
*H04M 3/22* (2006.01)
*H04B 3/32* (2006.01)
*H04M 3/34* (2006.01)
*H04M 11/06* (2006.01)
*H04B 3/487* (2015.01)

(56) References Cited

U.S. PATENT DOCUMENTS

| | | |
|---|---|---|
| 2006/0133534 A1 | 6/2006 | Verlinden et al. |
| 2008/0151742 A1* | 6/2008 | Stolle ............... H04M 3/085 370/201 |
| 2009/0268601 A1 | 10/2009 | Fang et al. |
| 2010/0027601 A1* | 2/2010 | Fang ................. H04B 3/32 375/222 |
| 2010/0254442 A1* | 10/2010 | Cendrillon ........ H04B 1/1027 375/220 |
| 2011/0051906 A1* | 3/2011 | Cioffi ............... H04B 3/32 379/32.04 |
| 2011/0206101 A1* | 8/2011 | Matza ............... H04B 3/487 375/222 |
| 2012/0219123 A1* | 8/2012 | Berg ................ H04B 3/487 379/27.01 |
| 2013/0010931 A1* | 1/2013 | Berg ................ H04B 3/487 379/22 |

OTHER PUBLICATIONS

Written Opinion of the International Searching Authority PCT/ISA/237 for International Application No. PCT/EP2013/065454 dated Nov. 5, 2013.

* cited by examiner

METHOD AND DEVICE FOR IDENTIFYING CROSSTALK

FIELD OF THE INVENTION

The present invention refers to a method for identifying crosstalk from a disturbing telecommunication to a victim telecommunication line of a communication network, the identifying depending on quiet line noise measurement data related to the victim telecommunication line. The present invention further refers to a corresponding device, to a corresponding monitoring node and to a corresponding computer program product.

BACKGROUND

In today's digital subscriber line (DSL) deployments, different variants of DSL techniques are used. For example, DSL techniques providing a rather low bit rate such as ADSLx; e.g. ADSL, ADSL2, ADSL2+ or READSL; and other DSL techniques that provide a comparatively high bit rate such as Very High Speed Digital Subscriber Line (VDSL); e.g. VDSL1 or VDSL2; are often used on different telecommunication lines that are grouped into a single binder arranged between a building and a cabinet of the network operator. Telecommunication lines configured for rather low bit rate communication typically end at DSL modem circuitry installed at a central office or a local exchange of the network operator. For these low bit rate telecommunication lines, the cabinet mainly serves as a cross-connect for electrically connecting the wires between the central office or local exchange and the cabinet to wires between the cabinet and the individual buildings.

Because high bit rate DSL techniques require the telecommunication line between the network operator's modem circuitry and a mode circuitry of the customer's premises equipment (CPE) not to exceed a maximum length of typically about a few hundred meters, the operator's modem circuitry of these high bit rate telecommunication lines is often installed in the cabinet. In other words, the cabinet may include an access node for the high bit rate communication lines. The access node may be connected via a high bit rate backhaul link, such as an optical link, to a communication network of the operator (Fiber To The Cabinet, FTTC). A cabinet having such an access node is also referred to as remote unit or flexibility point.

In order to avoid excessive crosstalk from the high bit rate lines to the low bit rate lines in a section of the low bit rate line in which the low bit-rate and the high bit rate line run in parallel (e. g. in the binder between the cabinet and the building), a Downstream Power Back-Off (DPBO) mechanism is applied on the high bit-rate telecommunication lines. DPBO allows shaping the Power Spectral Density (PSD) of a downstream signal from the modem circuitry in the cabinet to the modem circuitry of the CPE. In order to protect the low bit rate lines coming from the central office or local exchange and coexisting in the same binder, DPBO basically adjusts the downstream transmit PSD for VDSL2 lines such that the far-end crosstalk (FEXT) generated by these lines is equal to the FEXT generated by the rather low bit rate lines. Therefore, the impact from VDSL2 on ADSLx becomes equal to the impact from ADSLx itself.

In order to protect the low bit rate lines from the crosstalk caused by the high bit rate lines effectively, configuration parameters for DPBO must be set correctly. In case of incorrectly set configuration parameters, the crosstalk coming from the high bit rate lines will be abnormally high and seriously impact the performance of the low bit rate lines. DPBO is described in detail e. g. in the ITU-T recommendation G.997.1, in particular in appendix II of this recommendation.

SUMMARY

The object of the present invention is to provide a method and a device for identifying crosstalk that allows for detecting abnormally high crosstalk caused by high bit rate telecommunication lines running in parallel to a section of low bit rate telecommunication lines.

According to an embodiment, a method for identifying crosstalk from a disturbing telecommunication line to a victim telecommunication line of a communication network, is provided, the identifying depending on quiet line noise measurement data related to the victim telecommunication line, wherein the method comprises estimating a coupling length depending on the quiet line noise measurement data; and detecting depending on the coupling length and a physical length of the telecommunication line that the crosstalk is caused by a disturbing telecommunication line extending in parallel to a section of the victim telecommunication line. In other words, the coupling length is estimated from the quiet line noise measurement data and said the method detects that the crosstalk is caused by a disturbing telecommunication line extending in parallel to a section of the victim telecommunication line from the coupling length and a physical length of the telecommunication line. As the disturbing line runs in parallel with the victim line in a section of the victim line only and not along the whole victim line, excessive crosstalk originating from the disturbing line can be identified by considering both the physical line length of the victim line and the estimated coupling length.

In an embodiment, the victim telecommunication line is terminated at an access node located at a central office of a communication network, and the disturbing line is terminated at a further access node located at a remote site of the network, wherein the section is a section of the victim telecommunication line between the remote site and a customer side end of the victim telecommunication line. Typically, both lines are terminated at their customer side end, e.g. at a terminal side termination node (e.g. a DSL modem) of the respective CPE. In many cases, the central office, often also referred to as local exchange, is located farther away from the CPE than the remote site. That is, the remote site is remote with respect to the central office. Consequently, the disturbing line is shorter than the victim line. The remote site may include a cabinet, also referred to as remote node, flexibility point, remote unit, etc.

In an embodiment, the detecting that the crosstalk is caused by said disturbing line includes concluding that at least one parameter for Downstream Power Back-Off (DPBO) performed by the second access node for the disturbing line is incorrectly set. After the incorrect setting of the DPBO parameters has been detected, they can be corrected in order to eliminate the excessive crosstalk. In case that the operator of the victim line owns the disturbing line, the operator can correct the DPBO parameters by himself. Otherwise, the operator may contact another operator who owns the disturbing line.

In an embodiment, said detecting comprises comparing the coupling length and the physical length with each other.

In one embodiment, the comparing comprises calculating a relative deviation of the coupling length from the physical length and detecting that the crosstalk is caused by said disturbing line if the relative deviation is greater or equal a tolerance threshold.

In another embodiment, the comparing comprises detecting that the crosstalk is caused by said disturbing line if the difference between the physical line length and the coupling length is greater or equal to a further tolerance threshold.

The coupling length may be estimated based on measurements on the victim line. Any suitable approach for estimating the coupling length may be applied. In a preferred embodiment, estimating the coupling length comprises fitting a model, preferably a mathematical model, of the quiet line noise to the quiet line noise measurement data, wherein the coupling length is a parameter of the model.

In embodiments that use this fitting approach, the method may comprise checking whether a value of a target function indicating how well the model is fitted to the quiet line noise measurement data has reached an predefined acceptable range, which range corresponds to an acceptable fitting result, and concluding that the victim line is impacted by other sources of noise than the crosstalk from said disturbing line if the result of said checking is that the value is outside of the acceptable range. For example, the range may be specified by means of a single threshold value. By comparing the value of the target function with the threshold value, the method may determine whether or not the fitting result is acceptable. In an embodiment, the target function is a cost function to be minimized when fitting the model to the noise measurement data, and the fitting result may be considered acceptable if a value of the cost function is less or equal to the threshold.

In an embodiment, the mathematical model is a model for a far end crosstalk power spectral density, preferably the model specified in the ITU-T Recommendation G.996.1.

In an embodiment, the method may comprise determining the physical length of the victim telecommunication line. Said determining may be based on a predefined value of the physical line length, which may be accessible to a device that executes the method. In another embodiment, determining the physical line length comprises retrieving the physical line length from a database.

In yet another embodiment, the method comprises determining further measurement data related to the victim line and determining the physical line length is based on the further measurement data. In an embodiment, the further measurement data may include attenuation data that describe the attenuation of the victim line. In other words, the physical line length may be estimated depending on the attenuation data.

According to another embodiment, a device for identifying crosstalk from a disturbing telecommunication line to a victim telecommunication line of a communication network, is provided, the identifying depending on quiet line noise measurement data related to the victim telecommunication line, wherein the device is operable for estimating a coupling length depending on the quiet line noise measurement data; and detecting depending on the coupling length and a physical length of the telecommunication line that the crosstalk is caused by a disturbing telecommunication line extending in parallel to a section of the victim telecommunication line.

In an embodiment, the device is operable, preferably programmed for executing a method according to the invention, embodiments of which method are herein described.

According to yet another embodiment, a monitoring node comprising a communication interface for connecting the monitoring node to a network, is provided, wherein the monitoring node comprises the device for identifying crosstalk from a disturbing telecommunication line to a victim telecommunication line. For example, the device may be a controller of the monitoring node that may be arranged, preferably programmed, for executing the method described herein.

According to still another embodiment, a computer program product, preferably a computer readable storage medium is provided, the computer program product comprising a computer program, which computer program is programmed for executing a method according to the invention, embodiments of which method are herein described. The storage medium may comprise magnetic, optical or semiconductor media, e.g. disks, tapes, RAM, ROM, Flash Memory, etc. Furthermore the computer program product, in particular the computer program may be provided by a server for download over a network such as the Internet.

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
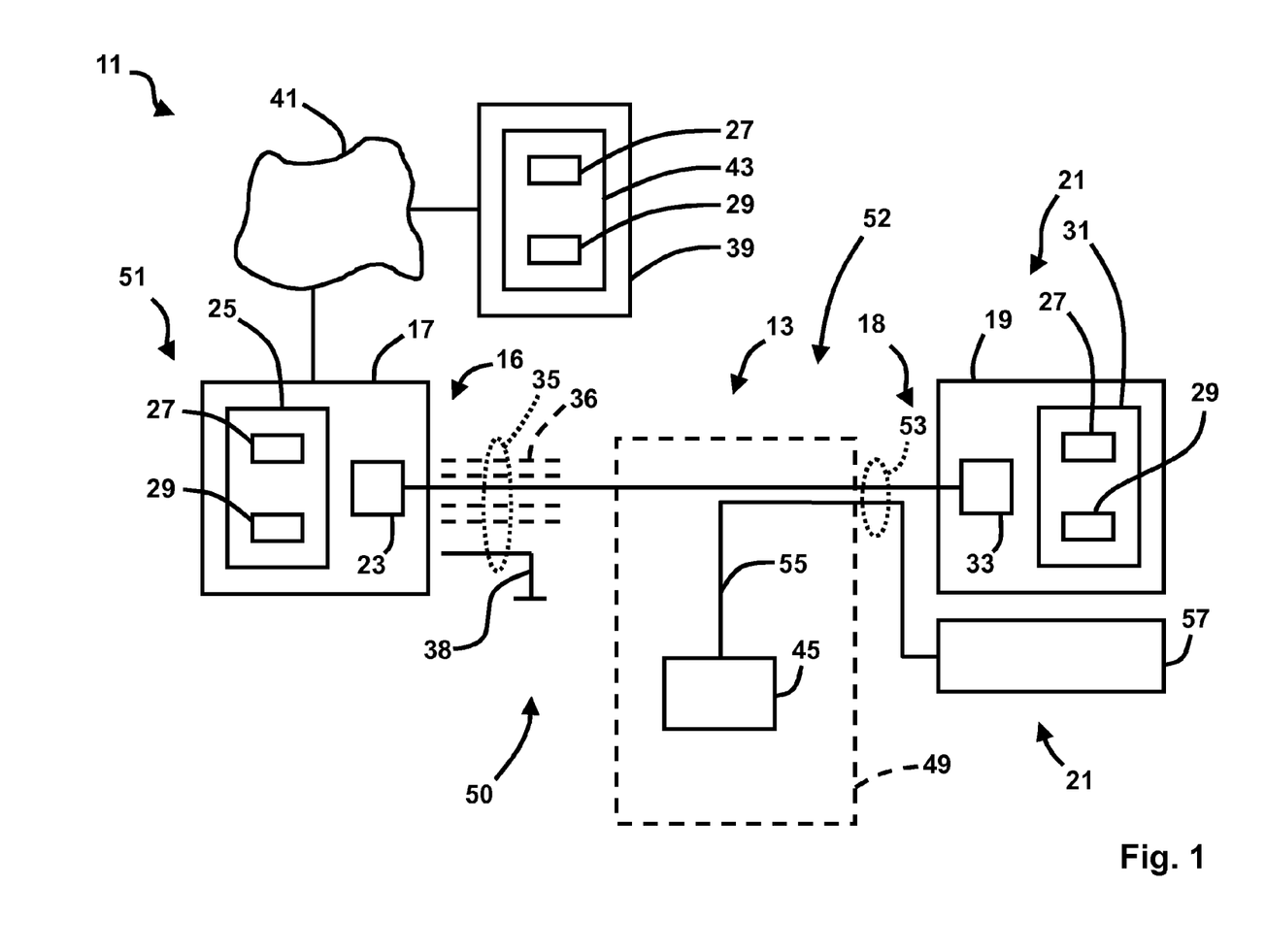
FIG. 1 shows a communication network.

FIG. 1 shows a communication network 11 comprising a first telecommunication line 13. A first end 16 of the telecommunication line 13 is connected to a network side termination node of the network 11, further referred to as access node 17, and a second end 18 of the line 13 is connected to a terminal side termination node 19 of the network 11. The terminal side termination node 19 may be part of customer premises equipment (CPE 21) of the network 11.

The first telecommunication line 13 may be a Digital Subscriber Line (DSL) of any type, such as ADSLx or VDSL, or the like. Consequently, the access node 17 may be a DSL Access Multiplexer (DSLAM) or another type of DSL access node. In the shown embodiment, the first telecommunication line 13 is an ADSLx line, i.e. a line that is used for DSL variants that have a rather low bit rate compared to other DSL variants like VDSL (e.g. VDSL1 or VDSL2). The terminal side termination node 19 may be a DSL modem or include a DSL modem.

The access node 17 has first modem circuitry 23 to which the first end 16 of the first line 13 is connected. In addition, the access node 17 has a first controller 25 adapted for controlling the operation of the access node 17. In an embodiment, the first controller 25 is a programmable computer comprising a processor 27, e. g. a microprocessor, and a storage element 29, e.g. semiconductor memory.

The terminal side termination node 19 includes second modem circuitry 33 to which the second end 18 of the first line 13 is connected. Furthermore, the terminal side termination node 19 comprises a second controller 31. The second controller 31 may have the same basic configuration as the first controller 25, i.e. the second controller 31 may be a programmable computer and comprise a processor 27 and/or a storage element 29.

In the shown embodiment, at least a section of the first line 13 is part of a binder 35 and extends in parallel to at least one further telecommunication line 36. The further line 36 may be e.g. a DSL line of any type. In the shown embodiment, the at least one further line 36 is another ADSLx line. The binder 35 may comprise an electrically conductive, preferably metallic, shielding 38 that may be grounded as depicted in FIG. 1.

Furthermore, the network 11 may comprise an optional monitoring station 39 connected e. g. via a interconnection network 41 to at least one of the nodes 17, 19 such that the station 39 can communicate with at least one of the nodes 17, 19, preferably the access node 17. The station 39 comprises a third controller 43. The third controller 43 may have the same basic configuration as the first controller 25, i.e. the third controller 43 may be a programmable computer and comprise a processor 27 and/or a storage element 29. In an exemplary embodiment, the station 39 may be a server, a personal computer, a handheld computer such as a PDA or cell phone, etc. In an embodiment, the collection and processing of the measurement data may not be done in the cell phone or laptop, but by a platform server. In this embodiment, the phones are clients that can retrieve the results of the collection and processing from the server.

As shown in FIG. 1, the network 11 comprises a further access node 45 that may be located at a remote site comprising a cabinet 49. The cabinet 49 is sometimes also referred to as remote node, flexibility point, remote unit, etc. In the shown embodiment, the remote site with the cabinet 49 is located near to a building where the CPE 21 is installed. In other words, the remote site is closer to the second end of the first line 13 than the central office 51.

The access node 17 may be located in a central office 51. Consequently, the first telecommunication line 13 begins at the central office 51, goes through the cabinet 49 and ends at the customer premises 21. In an embodiment, the cabinet 49 is a passive cross connect connecting a first section 50 of the line 13 arranged between the central office and the cabinet 51 to a second section 52 of the line 13 arranged between the cabinet 49 and the customer premises equipment 21. In particular, the first section 50 of the first telecommunication line 13 may extend within the first binder 35 and the second section 52 of the telecommunication line 13 may extend within a second binder 53, with the second binder 53 being installed between the cabinet 49 and e. g. a building where the CPE 21 is located.

A second telecommunication line 55 starts at the further access node 45, goes through the second binder 53 and ends at a further terminal side termination node 57, e. g. a further DSL modem 57, being part of the CPE 21 of another customer. That is, the second section 52 of the first telecommunication line 13 corresponds to a section of the line 13 where the two lines 13, 55 run at least essentially in parallel within the second binder 53. The further access node 45 may be connected to a high bit rate backhaul link, e.g. an optical link, the resulting access architecture therefore being called Fiber To The Cabinet (FTTC). In another embodiment, the cabinet 49 may be located at a different place. For example, the cabinet 49 may be located in a building where the CPE 21 is located (Fiber To The Building, FTTB). Because the remote site where the cabinet 49 is located is closer to the CPEs 21 than the central office 51, the second telecommunication line 55 is shorter than the first line 13 so that high bit rate services like VDSL can be provided over the second line 55.

The first telecommunication line 13 may be subject to crosstalk caused by the line 55 along its second section 52. Because the second telecommunication line 55 is terminated in the cabinet 49, there is no crosstalk from the second line 55 to the first line 13 within the first section 50 of the first line 13. That is, a coupling length L with respect to crosstalk from the second line 55 to the first line 13 is at least approximately the length of the second section 52. This coupling length is therefore less than a total physical length $L_{real}$ of the first line 13, which is at least approximately the sum of the lengths of the first section 50 and the second section 52.

Figure 2:
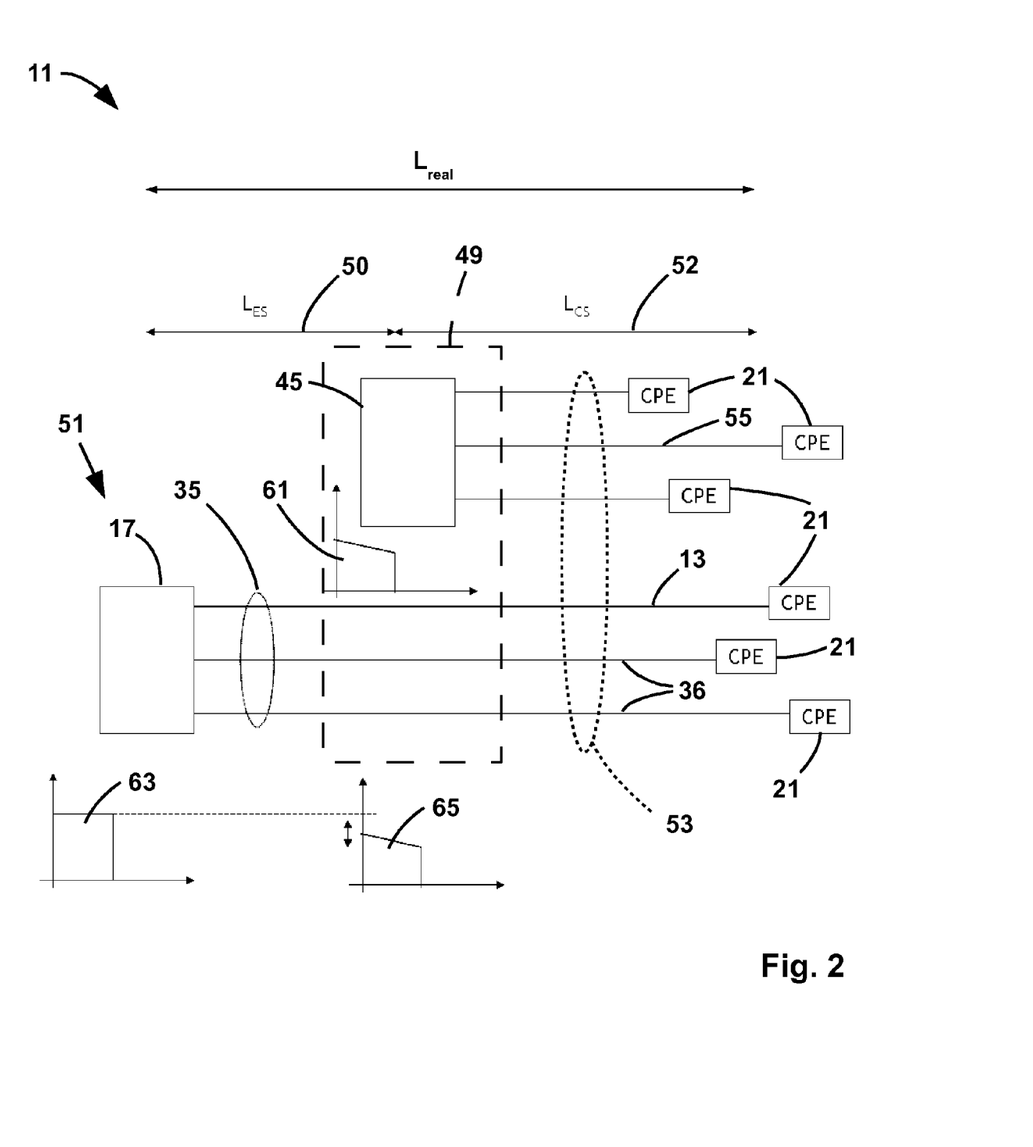
FIG. 2 shows a detail of the communication network of FIG. 1.

As shown in FIG. 2, multiple lines may be arranged between the further access node 45 and the CPE 21 of different customers. At least one of the lines between the further access node 45 and one of the CPE 21 is used for DSL transmissions with a higher maximum bit rate than on the lines 13, 36 between the central office 51 and the respective CPE 21. In the shown embodiment, this at least one line with the higher bit rate is a VDSL2 line. One of these VDSL2 lines corresponds to the second line 55 shown in FIG. 1. The second line 55 will be further referred to as disturbing line 55 because it may cause crosstalk to the first line 13.

The lines 13, 36 connected to the access node 17 at the central office use DSL techniques that have a smaller maximum bit rate than that at least one second line 55 connected to the further access node 45. In the shown embodiments, these lines 13, 36 connected to the central office 51 use an ADSL-variant (ADSLx), such as ADSL, ADSL2, ADSL2+, READSL, etc. The first line 13 will further also referred to as victim line 13 because it may be subject to crosstalk cause by other lines, in particular by the disturbing line 55.

When operating the network 11, Downstream Power Back-Off (DPBO) is applied for the lines 55 connected to the further access node 45 in order to avoid excessive crosstalk from the at least one high bit rate line 55 connected to the further access node 45 to the low bit rate lines 13, 36 connected to the central office 51. To this end, the DPBO mechanism applies a Power Spectral Density (PSD) mask to downstream transmissions. This has the effect that certain frequency ranges of the signals emitted by the further access node 45 in downstream direction are attenuated so that they cannot cause excessive crosstalk to the lines 13, 36 connected to the central office 51, e.g. to the victim line 13, which would seriously degrade the maximum bit rate of that line 13. The modified PSD mask is illustrated as a diagram 61 in FIG. 2. The decaying run of the PSD mask 61 illustrates that, in the shown example, DPBO attenuates higher frequencies of the downstream signal emitted by the further access node 45 to a higher extent than lower frequency signals. The access node 17 of the central office 51 uses an unmodified PSD mask (see diagram 63). Consequently, the PSD of the downstream signals transmitted by the access node 17 of the central office 51 is comparatively high for higher frequency. However, due to the attenuation within the first section 50 of the lines 13, 36 connected to the access node 17, the PSD of the signals transmitted by the access node 17 have a reduced PSD for higher frequencies at the cabinet 49 (see diagram 65). If the further access node 45 would transmit the downstream signals with an unmodified PSD mask (e. g. the PSD mask 63)

then there would be the risk of excessive crosstalk between e.g. the disturbing line 55 to the victim line 13 because the PSD of the downstream signals emitted by the further access node 45 would be higher than the PSD of the signals present in the victim line 13 at the cabinet 49 at least for the higher frequencies. However, by applying the PSD mask 61 according to DPBO, such excessive crosstalk from the disturber line 21 to the victim line 13 can be avoided.

This approach of avoiding crosstalk requires that several configuration parameters relevant for DPBO be set correctly. These parameters include characteristics of the line 13 within the first section 50, such as a length $L_{ES}$ of the line 13 within the first section 50, parameters of a model of the line within the first section 50 as well as characteristics of the signal transmitted by the access node 17 via the first section 50 in downstream direction. DPBO is described in detail in the ITU-T recommendation G.977.1 (April/2009), in particular in Annex II thereof.

At least one of the controllers 25, 31 or 43 is arranged for executing a method described herein for identifying crosstalk from the disturbing line 55 to the victim line 13. The method allows for concluding that the DPBO configuration parameters are incorrectly set if the method detects excessive crosstalk from the disturbing line 55 to the victim line 13. A computer program may be provided that is programmed such that at least one of the controllers 25, 31, 43 executes the method when running that computer program. In other words, the method may be executed on the access node 17, on the station 39, or the terminal side termination node 19. The computer program may be stored on at least one storage element 29. In addition, the computer program may be stored on any type of data storage media such as magnetic or optical disc or semiconductors storage media. Furthermore, the program may be provided by a server for transmission over a network, preferably the internet.

Figure 3:
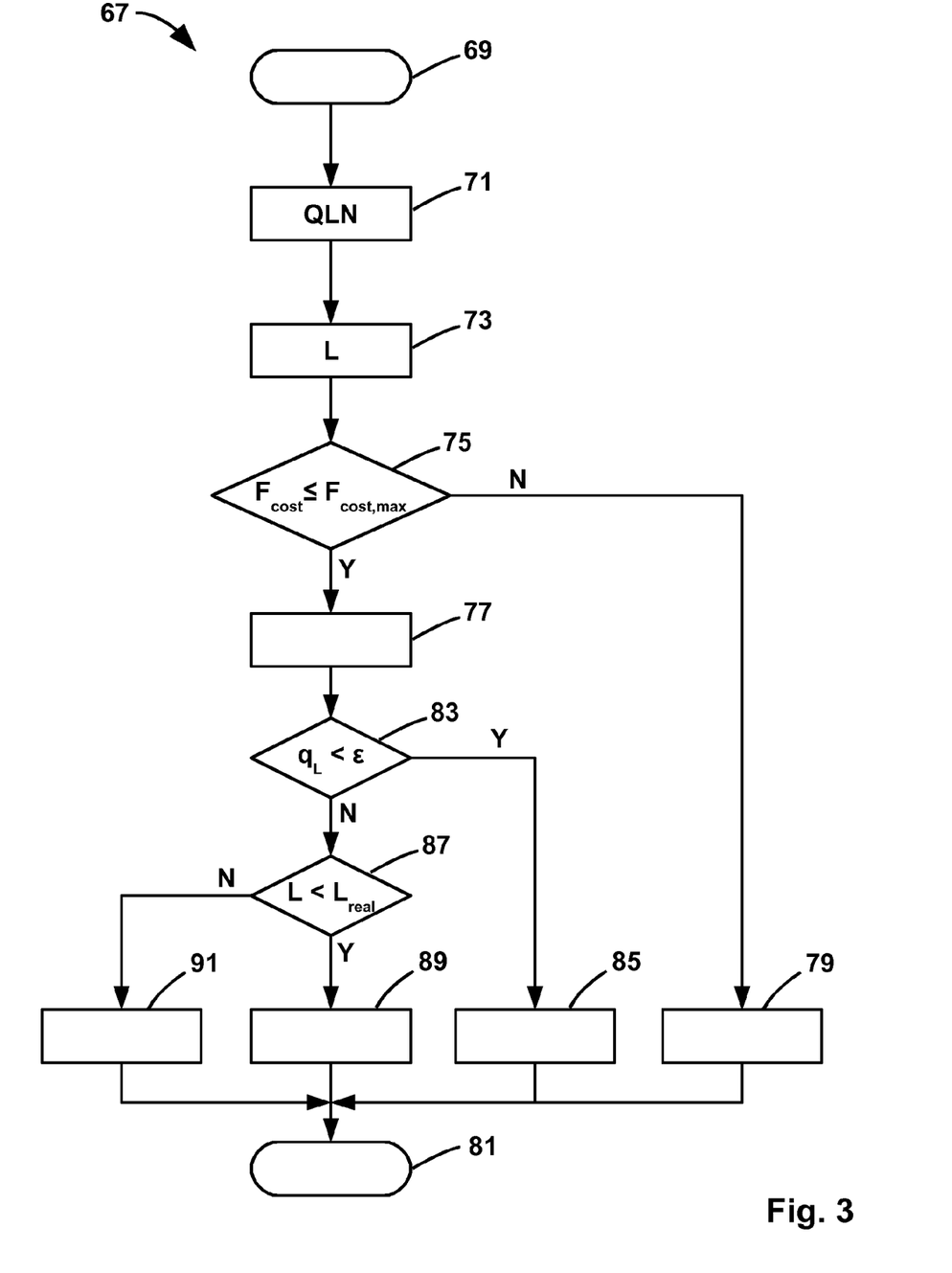
FIG. 3 shows a flowchart of a method for identifying crosstalk.

FIG. 3 shows a flowchart of the method 67 that allows to detect a situation where the victim line 13 is subject to excessive crosstalk caused by the disturbing line 55. This situation may be a result of incorrectly set DPBO configuration parameters. Thus, the method 67 allows an operator of the network 11 that owns one of the lines 13, 36 connected to the access node 17 of the central office 51 to diagnose a bad configuration of the DPBO parameters on the lines connected to the further access node 45 of the cabinet 49, i.e. the VDSL2 line, such as the disturber line 55. The method 67 may be executed e.g. on the monitoring node 39, which monitoring node 39 may be part of a network analyzer arranged for detecting the excessive crosstalk from the lines connected to the further access node 45 and optionally to perform additional network analyzing and test operations. In another embodiment, the method 67 is executed on any other node or element of the network such as one of the access nodes 17, 45.

After a start 69 of the method 67, a step 71 is executed that acquires wideband noise measurement data related to the victim line 13 from a terminating node 17, 19 connected to that line 13. Particular if a method 67 is executed on the monitoring station 39, due to the communication protocol such as SNMP may be used to retrieve the wideband noise measurement data. In the shown embodiment, the wideband noise measurement data include Quiet Line Noise (QLN) data related to of the victim line 13. The quiet line noise QLN is a power spectral density on the victim line 13 when the victim line is not carrying a data signal. The quiet line noise QLN may be represented as a frequency dependent vector.

After the QLN has been acquired in step 71, a step 73 estimates a coupling length L of the victim line 13. The coupling length L is the length of a section of the line 13, along which section the line 13 is subject to crosstalk caused by another telecommunication line such as the disturbing line 55. In the shown embodiment, the section of the victim line 13 that may be influenced by crosstalk from the disturbing line 55 corresponds to the second section 52, i.e. the second binder 53 between the cabinet 49 and e.g. the building where the CPEs 21 are installed.

In case of an incorrect setting of the DPBO configuration parameters, the QLN is dominated by the crosstalk caused by the disturbing line 55 along the second section 52. As a consequence, coupling length L estimated in step 73 would correspond at least essentially to the length $L_{CS}$ of the second section 52. Otherwise, crosstalk caused by the further telecommunication lines 36 connected to the access node 17 of the central office 51 would have an important impact on the overall QLN and step 73 would estimate a coupling line length L that corresponds at least essentially to the total physical length $L_{real}=L_{ES}+L_{CS}$ of the victim line 13. Thus, the excessive crosstalk from the disturbing line 55 to the victim line 13 may be detected by comparing the coupling length L with the physical loop length $L_{real}$ of the line 13 with each other.

The coupling length L may be estimated by any suitable approach. In the shown embodiment estimating the coupling length L comprises fitting a mathematical model of the QLN to the QLN measurement data determined in step 71. The coupling length L is a parameter of the mathematic model. In the shown embodiment, a model that describes the far-end crosstalk coupling (FEXT) described in the ITU-T recommendation G.996.1 (February/2001) is applied. This model describes the crosstalk as a function of the frequency f and the coupling length L as follows:

$$FEXT(f, L) = \qquad (1)$$
$$PSD(f) + 10\log_{10}(7.74 \cdot 10^{-21} \cdot Ndist^{0.6} \cdot 3.28 \ L \cdot f^2) + HLOG(L, f)$$

However, the method 67 may use another model instead. For example, the crosstalk as a function of at least the coupling length may be determined by measurements and corresponding supporting points may be generated. The crosstalk FEXT (f, L) as a function of at least the coupling length L may be determined by interpolation using these supporting points generated by measurement. The parameter Ndist of the model according to equation (1) is a number of disturbers. PSD(f) is the power spectral density of the disturber and HLOG(L, f) is a transfer function which can be approximated as follows:

$$H\ LOG(L,f) = 20 \cdot \log_{10}(|e^{-k\sqrt{j \cdot L}}|) \qquad (2)$$

In equation (2), the constant k represents the cable linear attenuation factor.

As discussed above, for crosstalk caused by the lines 13, 36, e.g. ADSLx lines, connected to the access node 17 of the central office 51 the coupling length is:

$$L = L_{ES} + L_{CS} \qquad (3)$$

where $L_{ES}$ is the length of the first section 50 (the length of the line 13 on the exchange-side of the cabinet 49) and $L_{CS}$ is the length of the line 13 within the second section 52 (the customer-side of the line 13 with respect to the cabinet 49).

The measured quiet line noise represented by the QLN measurement data acquired in step 71 is composed of three types of noise: the crosstalk $FEXT_{CO}$ coming from other lines 36 connected to the access node 17 of the central office 51; the crosstalk $FEXT_{RT}$ coming from at least one of the lines connected to the further access node 45 of the cabinet 49, in particular from the disturbing line 55; and a CPE noise floor $\min_{QLN}$. All three components of the measured QLN may be expressed in dBm/Hz as follows:

$$QLN = 10 \cdot \log_{10}\left(10^{\frac{FEXT_{RT}}{10}} + 10^{\frac{FEXT_{CO}}{10}} + 10^{\frac{minQLN}{10}}\right) \quad (4)$$

The components $FEXT_{RT}$ and $FEXT_{CO}$ are expressed using the above equation (1) and substituting PSD by $PSD_{RT}$ and $PSD_{CO}$ respectively, and L by $L_{CS}$ and $L_{ES}+L_{CS}$ respectively. The $PSD_{RT}$ may be approximated by the worst case, which is the PSD mask defined in the above-mentioned standard ITU-T G.993.2 (February/2001). $PSD_{CO}$ may be measured directly, e.g. by retrieving data describing the $PSD_{CO}$ from the access node 17.

Figure 4:
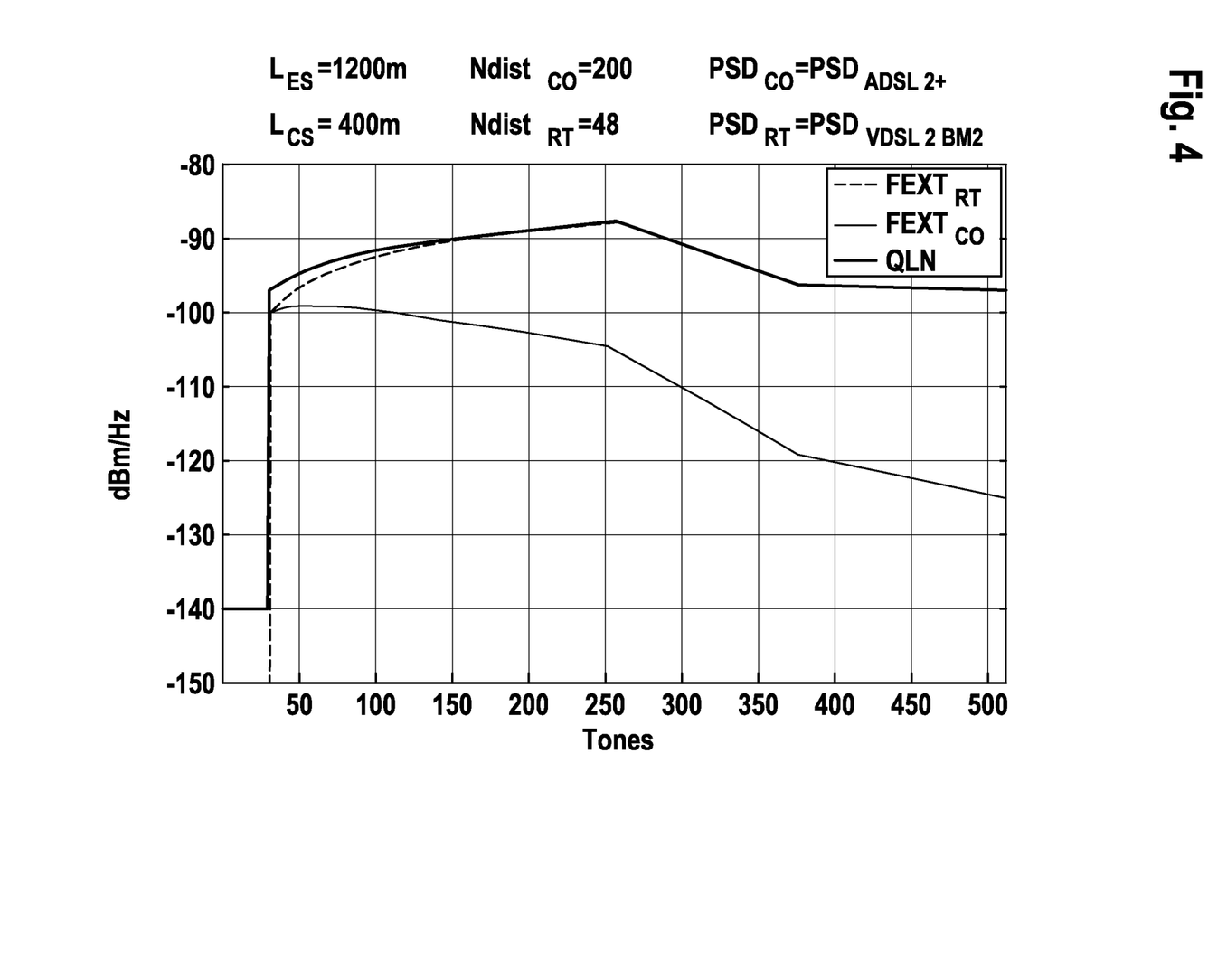
FIG. 4 shows a diagram of a quiet line noise of a communication line of the network shown in FIGS. 1 and 2 as well as components of the quiet line noise.

FIG. 4 shows the components $FEXT_{RT}$ (dashed line) and $FEXT_{CO}$ (dotted line) as well as the resulting QLN (continuous line) in an exemplary scenario where no DPBO is used at all. This scenario where no DPBO is used at all is an extreme case, where the crosstalk coming from the lines connected to the further access node 45, e.g. VDSL2 lines, would be largely dominant, completely hiding the crosstalk originating from the lines 13, 37 connected to the access node 17. Therefore, the $FEXT_{CO}$ term in equation (4) disappears at least almost completely. Consequently, equation (4) can then be simplified to a single FEXT source ($FEXT_{RT}$), with an expected coupling length equal to the length $L_{CS}$ of the second section 52. This length is much shorter than the physical length $L_{real}$ of the lines connected to the access node 17 of the central office 51, e.g. the ADSLx lines. As can be seen in FIG. 4, the crosstalk $FEXT_{CO}$ from the lines 13, 37 connected to the access node 17 is much below the crosstalk $FEXT_{RT}$ of the lines connected to the further access node 45 of the cabinet 49, such as the disturbing line 55. As a consequence, the curves $FEXT_{RT}$ and QLN run close to each other, in particular for higher frequencies.

In the scenario shown in FIG. 4, unmodified power spectral density masks 63 have been applied on the access nodes 17, 45 ($PSD_{CO}=PSD_{ADSL}+$, $PSD_{RT}=PSD_{VDSLBM2}$). These PSD mask are specified in the ITU-T Recommendations related to ADSLx and VDSL.

Another extreme case corresponds to a scenario where the DPBO configuration parameters have been set correctly according to an equal-FEXT hypothesis according to which the crosstalk coming from the lines connected to the further access nodes, e.g. VDSL2 lines, will appear identical to the crosstalk originating from the lines 13, 37 connected to the access nodes 17 of the central office 51, e.g. ADSLx lines. Therefore, the $FEXT_{RT}$ term should disappear at least almost from equation (4). Equation (4) can then be simplified to the case of a single crosstalk source ($FEXT_{CO}$) with an expected coupling length L being equal to the physical length $L_{real}=L_{ES}+L_{CS}$ of the victim line 13.

In the shown embodiment, step 73 determines a coupling length L by fitting the model of equation (1) to the measured QLN data acquired in step 71 by optimizing the parameters L, Ndist of the model. In particular, the values of the model parameters L, Ndist may be determined by minimizing a cost function $F_{cost}$ using a suitable optimization algorithm. In the shown embodiment, the following cost function is used:

$$F_{cost} = \sum \left|QLN - 10 \cdot \log_{10}\left(10^{\frac{FEXT(L,Ndist)}{10}} + 10^{\frac{minQLN}{10}}\right)\right|^2 \quad (5)$$

In an embodiment, when fitting the model to the measured QLN data, the extreme scenario where no DPBO is applied is used for modeling the crosstalk, i.e. $FEXT(f, L)=FEXT_{RT}(f, L)$. That is, the unmodified standardized PSD mask for the signals to be transmitted by the further access node 45 is used as PSD(f) in equation (1), and the quiet line noise component $FEXT_{CO}$ is neglected. Equation (1) is then used for calculating the expression $FEXT(f, L)=FEXT_{RT}(f, L)$ in equation (5).

After the optimization algorithm of step 73 has found optimal values of the parameters L, Ndist, a branch 75 of the method 67 is executed. Branch 75 checks if the value of the cost function $F_{COST}$ is less or equal with respect to a predefined threshold $F_{cost, max}$. If so, (Y) a step 77 is executed, otherwise a step 79 is executed that concludes that the victim line 13 is impacted by other sources of noise like Radio Frequency Interference (RFI) or Single-Pair High-Speed Digital Subscriber Line (SHDSL), and that no further conclusion on whether or not the crosstalk caused by the disturbing line 55 is excessive can be drawn. After step 79 the method 67 is terminated in a step 81.

In case that the cost function $F_{COST}$ is well minimized, step 77 compares the estimated coupling length L with the physical line length $L_{real}$. The physical line length $L_{real}$ may be determined depending on a predefined value such as a manually entered value of the length $L_{real}$ or by retrieving the physical line length $L_{real}$ from a data base that stores data about the communication network 11. As an alternative, the physical length may be determined depending on a measured attenuation on the victim line 13. Moreover, the physical line length $L_{real}$ may be determined by means of the curve fitting approach described above in connection with step 73, with the coupling length L being determined in a case where it is known that the crosstalk is dominated by crosstalk $FEXT_{CO}$ originating from a line 36 running at least almost completely in parallel with the victim line 13. In this case, the estimated coupling length L corresponds at least essentially to the physical line length $L_{real}$.

To compare the coupling length L with the physical line length $L_{real}$ any suitable comparison operation may be performed. For example, a difference between the coupling length L and the physical line length $L_{real}$ may be compared with a threshold. Alternatively, the method 67 may just check whether or not the physical line length $L_{real}$ is greater than the coupling length L. In the shown embodiment, a branch 83 of the method 67 calculates a relative deviation $q_L$ of the coupling length L from the physical length $L_{real}$. Branch 83 checks if the relative deviation $q_L$ is less than a tolerance threshold $\epsilon$. If so (Y), the method 67 continues with a step 85 that concludes that the victim line 13 is not subject to excessive crosstalk caused by the disturbing line 55. The condition checked in branch 83 can be expressed as follows:

$$q_L = \frac{|L - L_{real}|}{L_{real}} < \epsilon \quad (6)$$

The tolerance threshold $\epsilon$ may be in the range from 0 to 50 percent, preferably 2 to 20 percent, preferably 5 to 15 percent, preferably 10 percent.

Otherwise (N), a further branch 87 of the method 67 checks whether the coupling length L is less than the physical line length $L_{real}$. If so (Y) a step 89 is executed that concludes that the victim line 13 is subject to excessive crosstalk and that the DPBO parameters are not configured correctly. Otherwise (N), a step 91 is executed to assert that no valid conclusion on whether the victim line 13 is subject to excessive crosstalk caused by the disturbing line 55 is possible. After the steps 89 and 91 the method is terminated in step 81.

The method 67 may be executed repeatedly for every line 13, 36 connected to the access node 17 of the central office 51 in order to check if the individual lines 13, 36 are subject to excessive crosstalk or not.

To sum up, the method 67 exploits the fact that the length $L_{CS}$ of the second section 52 is less than the total physical length $L_{real}=L_{ES}+L_{CS}$ of the victim line 13 and that crosstalk originating from any disturbing line 55 connected to the access node 45 of the cabinet 49 dominates the measured quiet line noise QLN of any line 13 connected directly to the access node 17 of the central office 51 if the DPBO configuration parameters of the access node 45 are incorrectly set. Consequently, an excessive crosstalk from any disturbing line 55 to a victim line 13 may be detected by comparing an estimated coupling length L with the physical length $L_{real}$ of the victim line 13. If the coupling length L is considerably less than the physical length $L_{real}$ then excessive crosstalk caused by the disturbing line connected to the access node 45 of the cabinet 49 may be detected in step 89. By using the method 67, operators of the network 11 can have a much more thorough diagnosis if an abnormal crosstalk is detected. In particular, the operator is able to detect an incorrect setting of the DPBO configuration, e.g. in VDSL2 neighbor lines 55. If the operator is owner of these neighbor lines 55, then the operator may correct the setting of these DPBO parameters. If another operator is owner of these lines, the operator of the victim line 13 is able to contact the other operator or to complain to the regulator because the operator of the neighbor lines does not respect spectral regulations.

The invention claimed is:

1. A method for identifying crosstalk from a disturbing telecommunication line to a victim telecommunication line of a communication network, the identifying depending on quiet line noise measurement data related to the victim telecommunication line, wherein the method comprises:
    estimating a coupling length of the victim telecommunication line, the estimating depending on the quiet line noise measurement data related to the victim telecommunication line; and
    detecting, depending on the coupling length of the victim telecommunication line and a physical length of the victim telecommunication line, that the crosstalk is caused by the disturbing telecommunication line extending in parallel to a section of the victim telecommunication line;
    wherein the quiet line noise measurement data indicates a power spectral density on the victim telecommunication line concurrently with data signals being absent from the victim telecommunication line.

2. The method according to claim 1, wherein the victim telecommunication line is terminated at an access node located at a central office of a communication network, the disturbing telecommunication line is terminated at a further access node located at a remote site of the network, and wherein the section is a section of the victim telecommunication line between the remote site and a customer side end of the victim telecommunication line.

3. The method according to claim 1, wherein the detecting that the crosstalk is caused by the disturbing telecommunication line includes concluding that at least one parameter for downstream power back-off performed by the further access node for the disturbing telecommunication line is incorrectly set.

4. The method according to claim 1, wherein the detecting that the crosstalk is caused by the disturbing telecommunication line includes comparing the coupling length of the victim telecommunication line and the physical length of the victim telecommunication line with each other.

5. The method according to claim 4, wherein the detecting that the crosstalk is caused by the disturbing telecommunication line includes calculating a relative deviation of the coupling length of the victim telecommunication line from the physical length of the victim telecommunication line, and detecting that the crosstalk is caused by the disturbing telecommunication line where the relative deviation is greater or equal to a tolerance threshold.

6. The method according to claim 4, wherein the detecting that the crosstalk is caused by the disturbing telecommunication line includes detecting that the crosstalk is caused by the disturbing telecommunication line where the difference between the physical length of the victim telecommunication line and the coupling length of the victim telecommunication line is greater or equal to a further tolerance threshold.

7. The method according to claim 1, wherein estimating the coupling length of the victim telecommunication line comprises fitting a model of the quiet line noise to the quiet line noise measurement data, wherein the coupling length of the victim telecommunication line is a parameter of the model.

8. The method according to claim 7, further comprising:
    checking whether a value of a target function indicating how well the model is fitted to the quiet line noise measurement data has reached an predefined acceptable range, which range corresponds to an acceptable fitting result, and
concluding that the victim telecommunication line is impacted by other sources of noise than the crosstalk from the disturbing telecommunication line where the result of the checking is that the value is outside of the acceptable range.

9. The method according to claim 7, wherein the model is a mathematical model for a far end crosstalk power spectral density, preferably the model specified in the ITU-T Recommendation G.996.1.

10. The method according to claim 1, wherein
    the physical length of the victim telecommunication line is predefined; or
    the method further comprises:
        retrieving the physical length of the victim telecommunication line from a database.

11. The method according to claim 1, further comprising:
    determining further measurement data related to the victim telecommunication line and determining the physical length of the victim telecommunication line depending on the further measurement data.

12. A device for identifying crosstalk from a disturbing telecommunication line to a victim telecommunication line of a communication network, the identifying depending on quiet line noise measurement data related to the victim telecommunication line, wherein the device is operable for
    estimating a coupling length of the victim telecommunication line, the estimating depending on the quiet line noise measurement data related to the victim telecommunication line; and
    detecting, depending on the coupling length of the victim telecommunication line and a physical length of the victim telecommunication line, that the crosstalk is caused by the disturbing telecommunication line extending in parallel to a section of the victim telecommunication line;
    wherein the quiet line noise measurement data indicates a power spectral density on the victim telecommunication line concurrently with data signals being absent from the victim telecommunication line.

13. The device according to claim 12, wherein the device is operable, preferably programmed for executing a method according to claim 1.

14. A monitoring node comprising a communication interface for connecting the monitoring node to a network, wherein the monitoring node comprises the device according to claim 12.

15. A computer program product, preferably a computer readable storage medium, comprising a computer program, which computer program is programmed for executing the method according to claim 1 when run on a computer.

* * * * *